March 31, 1925. 1,532,008
R. S. WALFORD
WIND SCREEN FOR CYCLES, MOTOR CYCLES, OR THE LIKE
Filed March 9, 1923 2 Sheets-Sheet 1
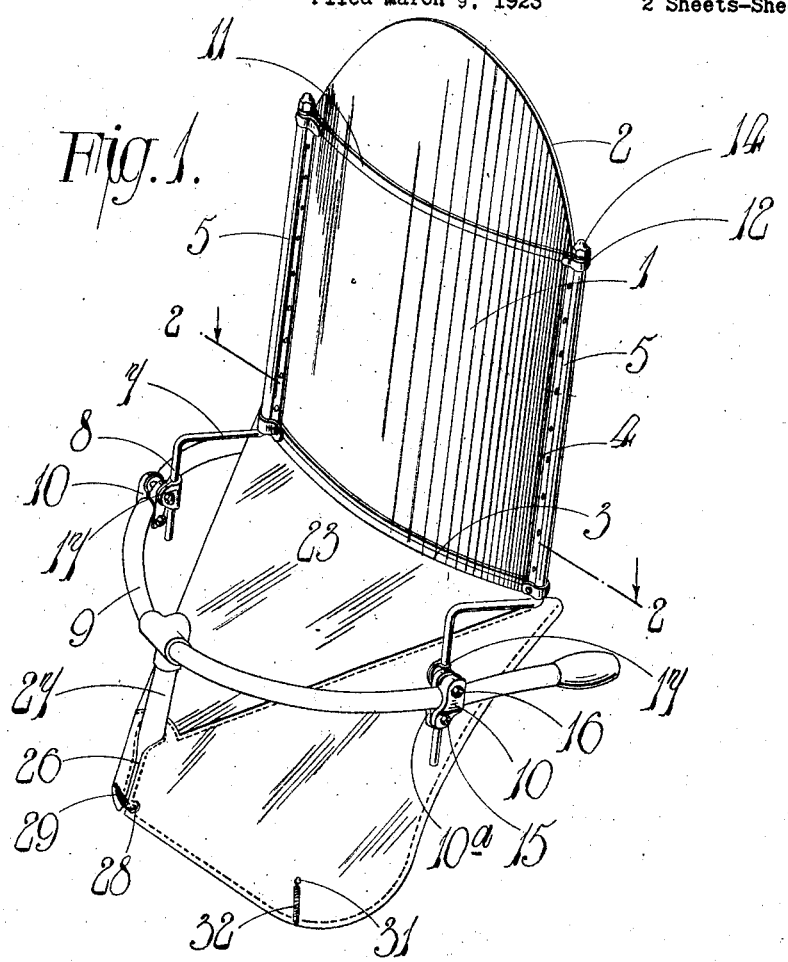
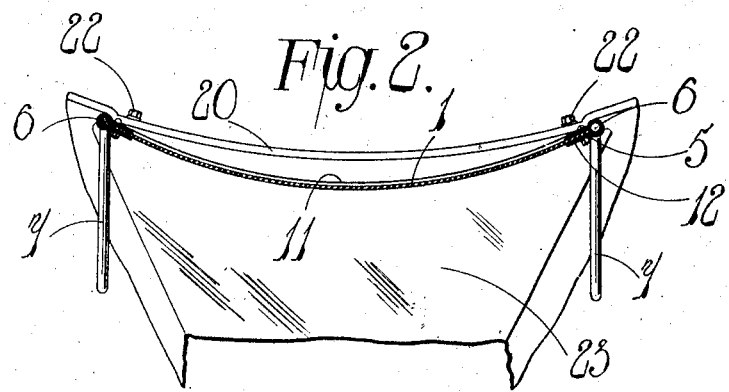

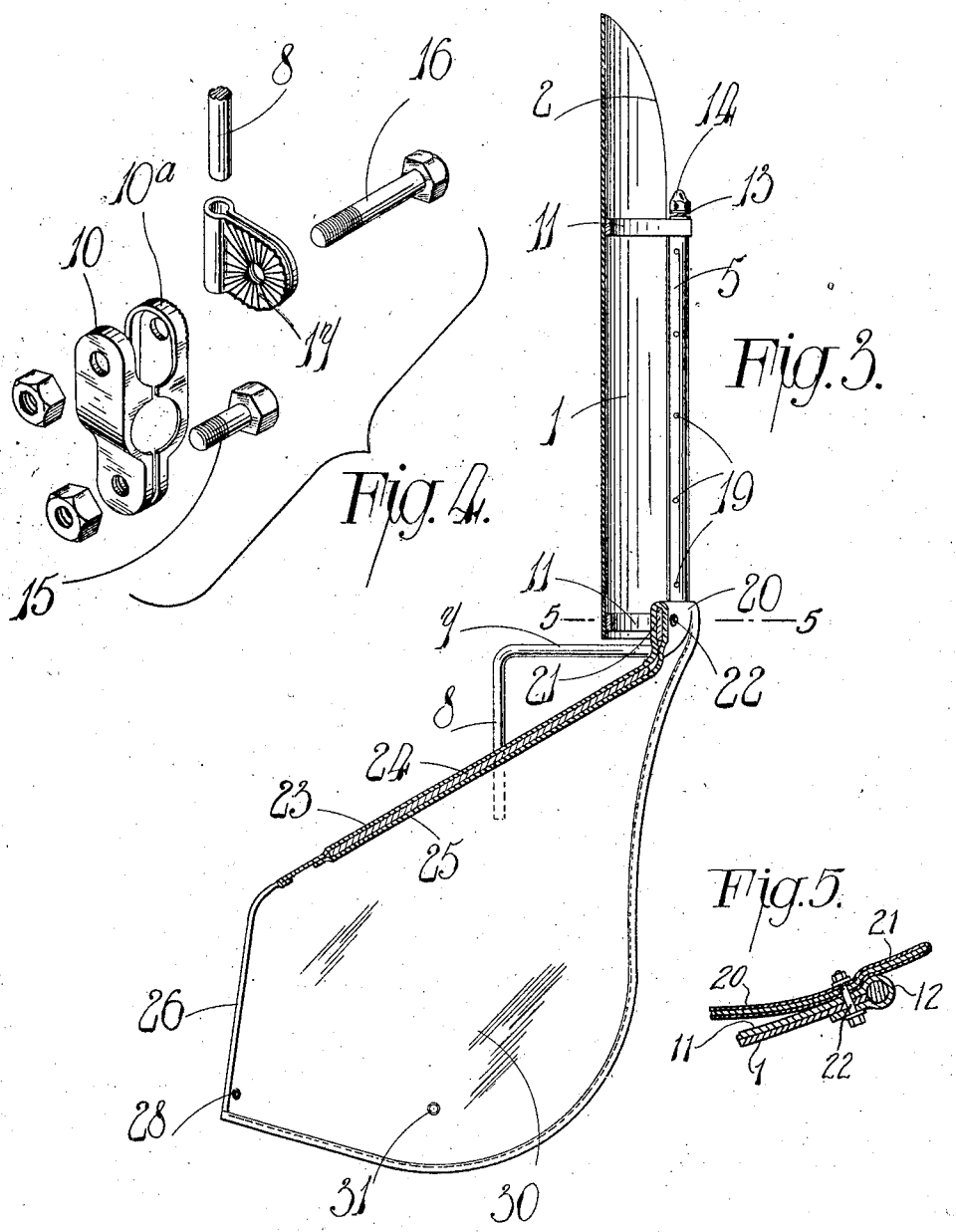

Patented Mar. 31, 1925.

1,532,008

UNITED STATES PATENT OFFICE.

ROBERT SCOTT WALFORD, OF BIRMINGHAM, ENGLAND, ASSIGNOR TO EASTING WINDSCREENS LIMITED.

WIND SCREEN FOR CYCLES, MOTOR CYCLES, OR THE LIKE.

Application filed March 9, 1923. Serial No. 623,971.

*To all whom it may concern:*

Be it known that I, ROBERT SCOTT WALFORD, a subject of the King of Great Britain, residing at 132 Steelhouse Lane, Birmingham, in the county of Warwick, England, have invented certain new and useful Improvements in Wind Screens for Cycles, Motor Cycles, or the like; and I do hereby declare the following to be a full, clear, and exact description of the same.

This invention relates to wind screens and is more particularly intended for wind screens for attachment to the handle bars of cycles or motor cycles. The object of the present invention is to provide a screen which will be applicable to any shape or size of handle bar, which will be convenient to manufacture and to pack, and which can be adjusted to any position on the handle bar to suit the rider.

A wind screen according to the present invention comprises a sheet of flexible transparent material having at or near its vertical edges, members which can be held securely in clips or sockets on the handle bar.

The members provided upon the screen for securing it to clips or sockets on the handle bar are preferably cranked so that these can be adjusted to suit various shapes or sizes of handle bar or to suit the requirements of individual riders.

Referring to the drawings:—

Figure 1 is a perspective view showing a wind screen according to this invention, mounted on the handle bars.

Figure 2 is a plan view partly in section on the line 2—2 in Figure 1.

Figure 3 is a vertical central section in Figure 1, the screen being shown in a vertical position.

Figure 4 is a perspective view of the clip members removed.

Figure 5 is a fragmentary horizontal section on line 5—5 in Figure 3.

In the construction illustrated upon the accompanying drawings, the screen itself comprises a sheet 1 of transparent material, preferably celluloid or any other flexible kind, the upper edge 2 of which is curved. Between this upper edge 2 and lower edge 3, the screen has two substantially parallel straight sides 4.

The substantially parallel upright sides 4 of the screen are enclosed in framing members 5 which are spaced apart and formed of thin metal, preferably of channel section, the base of each channel being bent into part circular form in cross section for receiving the vertical supporting members which are conveniently in the form of rods 6. The sides of the screen are secured in the said framing members 5 by means of the bolts 19.

These rods 6 extend downwardly until they are just clear of the screen and are then bent forwardly to form the part and they terminate in downwardly extending shanks 8 which are adapted to be secured to the handle bar 9 in suitable sockets or clips 10.

At the upper and lower ends of the framing members 5, strip metal members 11 of suitable curved form are provided extending across the screen, the screen being drawn against these members and thus being held in a suitable curved form. The ends 12 of these strip metal members 11 are bent into crook form and engage round the upper and lower projecting portions of the rod 6. The upper ends of the rods 6 are threaded and provided with a spring washer 13 and a screw cap 14 to retain them in the framing members 5.

The sockets or clips 10 are adjustably mounted on the handle bar, and each comprise two sheet metal members 10 and 10ª adapted to be clamped by securing bolts or screws 15 and 16 on to the handle bar 9, and the upper securing bolt 16 is provided with a clip 17 made in one piece and adapted to form a contractible socket for receiving the shank 8 of one of the cranked members on the screen.

With this arrangement of cranked supporting rods 6, rotatably mounted in the channel members 5 of the screen and adjustably mounted on the handle bars 9, any desired position of the screen may be obtained, and, in addition, the screen is capable of being fitted to any shape of handle bar. The screen may be tilted to any required angle and moved laterally or forwardly and rearwardly, so as to be the required distance from the driver's face.

At its lower end the screen 1 is provided with a downwardly extending shield, conveniently in the form of an apron for giving protection to the lower part of the body and the legs of the driver. This apron, which is made of leather or other suitable flexible material has its upper edge 20 secured around a metal or like stiffening strip 21, and this portion is secured to the ends of the lower curved cross strip 11 of the screen, by means of the two bolts 22.

The apron is provided with a stiffening member in the form of a central triangular panel 23 having its base adjacent the upper edge 20 of the apron, and this panel is stiffened by means of the board or plate 24 secured in position by the piece of material 25 sewn on to the back of the apron. At the vertex of this triangular panel the apron is split, and is adapted to hang down on either side of the frame. At the lower end of the split 26 the apron is provided with a pair of eyelet holes 28 and a coil spring 29 is adapted to hook into the said holes 28 and secure the two parts of the apron together at the front of the handle bar stem 27.

At its lower corners 30, the apron is provided with small hook-like members 31, to which are attached one end of a coil spring 32, the other end being adapted to be secured to the footboard, leg shields, or other convenient part of the bicycle.

It will be observed that when the clips 17 are released, each of the cranked rods 6, 7 and 8 can turn in the clips 17 so as to allow the screen to move with a parallel movement from side to side. Further, by suitably slackening the handle bar clips, the screen can be tilted to any required angle. The screen can be adjusted nearer to or further away from the driver by moving the handle bar clips and suitably adjusting the cranks 7.

The sheet 2 of flexible material may be made of celluloid, and as this may get damaged or become discoloured after considerable use, it can be removed from the framing members 5 and a fresh sheet can be inserted in its place.

Although I have shown a screen of flexible material retained in a curved position by the bands 11, it is within the scope of this invention to use a screen of rigid material, such as glass.

What I claim then is:—

1. A wind screen for cycles, motor cycles or the like comprising a sheet of transparent material, framing members for the side edges of said sheet, each having two spaced parts adapted to fit around the sides of the sheet and a part-circular portion, supporting members in the part-circular portion of the framing member, and clips to secure the supporting members upon the handle.

2. A wind screen for cycles, motor cycles or the like comprising a sheet of transparent flexible material; framing members for the side edges of said sheet, each having two spaced parts adapted to fit around the sides of the sheet and a part-circular portion; supporting members in the part-circular portion of the framing member; rigid curved strips extending transversely of the sheet to retain the latter in a curved condition; crook-like ends on said strips, adapted to engage round the supporting members; and a shield extending downwardly from the bottom of the sheet.

3. A wind screen for cycles, motor cycles or the like comprising a sheet of transparent material; framing members for the side edges of said sheet, each having two spaced parts adapted to fit around the sides of the sheet and a part-circular portion; supporting members on the part-circular portion of the framing member; means for securing said supports upon the handle bars; rigid curved strips extending transversely of the sheet to retain the latter in a curved condition, crook-like ends on said strips adapted to engage round the supporting members, and means for detachably securing said sheet upon the frame.

4. A wind screen for cycles, motor cycles or the like comprising an apron extending downwardly from the bottom of the sheet to protect the lower part of the body and legs of the rider, a triangular panel of stiffening material having its base adjacent the edge of the apron which is secured to the screen, and means for detachably securing the apron adjacent the apex of the panel and at its sides in an extending position.

5. A wind screen for cycles, motor cycles or the like comprising a sheet of transparent material; framing members for the side edges of said sheet, each having two spaced parts adapted to fit around the sides of the sheet and a part-circular portion; cranked supporting members in the part-circular part of the framing member; clamping members adapted to detachably hold said supporting members; clip members adapted to be adjustably mounted on the handle bar; means for adjustably securing said clamping member on the clip member and also for securing said clip on the handle bar; rigid curved strips extending transversely of the sheet to retain the latter in a curved condition; crook-like ends on said strips adapted to engage round the supporting members; means for detachably securing said sheet within the framing members; and a shield extending downwardly from the bottom of the sheet to protect the lower part of the body and the legs of the rider.

6. A wind screen for cycles, motor cycles or the like having in combination, a screen proper; rigid members at its vertical side edges; and laterally adjustable means adjustable both angularly and laterally for mounting the screen directly upon the cycle handle bar, whereby a standard size of screen can be fitted to practically any width or shape of handle bar.

7. A wind screen for cycles, motor cycles or the like having in combination a screen proper; rigid members at its vertical side edges; means adjustable both angularly and laterally relatively to the screen for mounting said screen upon the cycle handle bar, whereby a standard size of screen can be fitted to practically any width or shape of handle; and means providing a tilting connection between said adjustable mounting means and the screen.

8. A wind screen for cycles, motor cycles or the like having in combination a screen proper; rigid members at its vertical side edges; cranked supporting members for the screen having a pivotal connection both with the handle bar and with the rigid members to give lateral adjustment to the screen, and means for mounting the supporting members on the handle bar.

9. A wind screen for cycles, motor cycles or the like having in combination a screen proper; supporting members rotatably mounted on the screen having their lower ends extending beyond and out of alignment with the upper parts whereby the lower parts are adjustable laterally of the screen; and a clip rotatably mounted on the lower part of each of the supporting members so that it can turn at right angles to the direction of rotation of the supporting members; and serve to tiltably secure the screen upon cycle handle bars of different sizes and shapes.

In witness whereof I affix my signature.

R. SCOTT WALFORD.